United States Patent Office
3,362,255
Patented Jan. 9, 1968

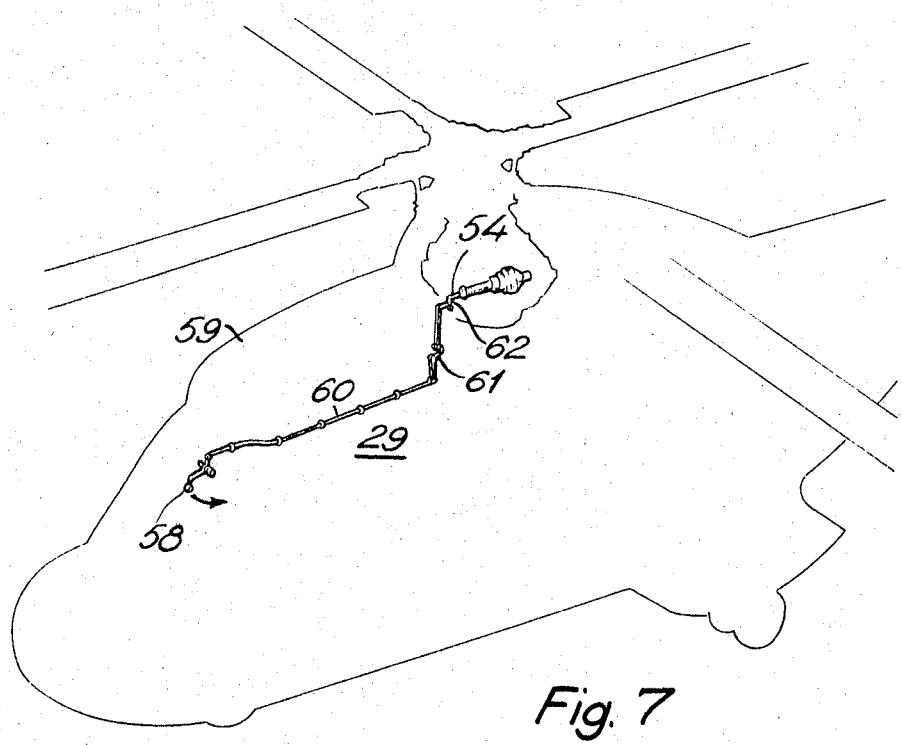
Fig. 7
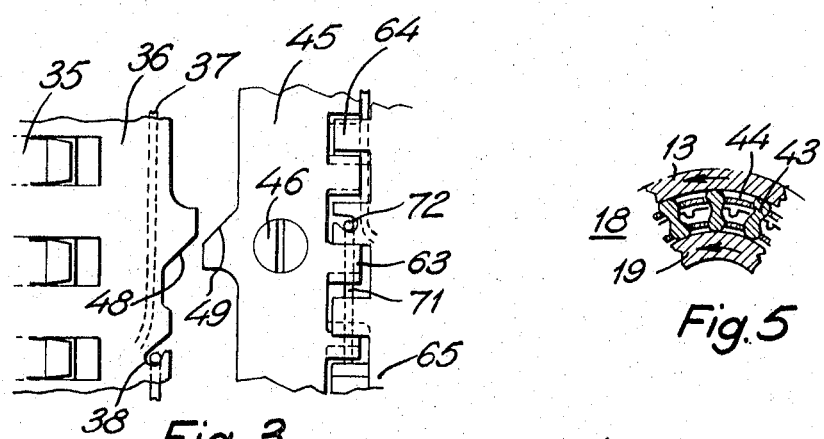
Fig. 3
Fig. 5
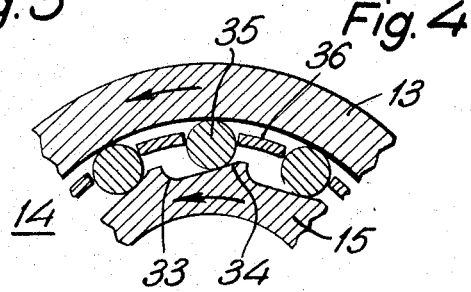
Fig. 4

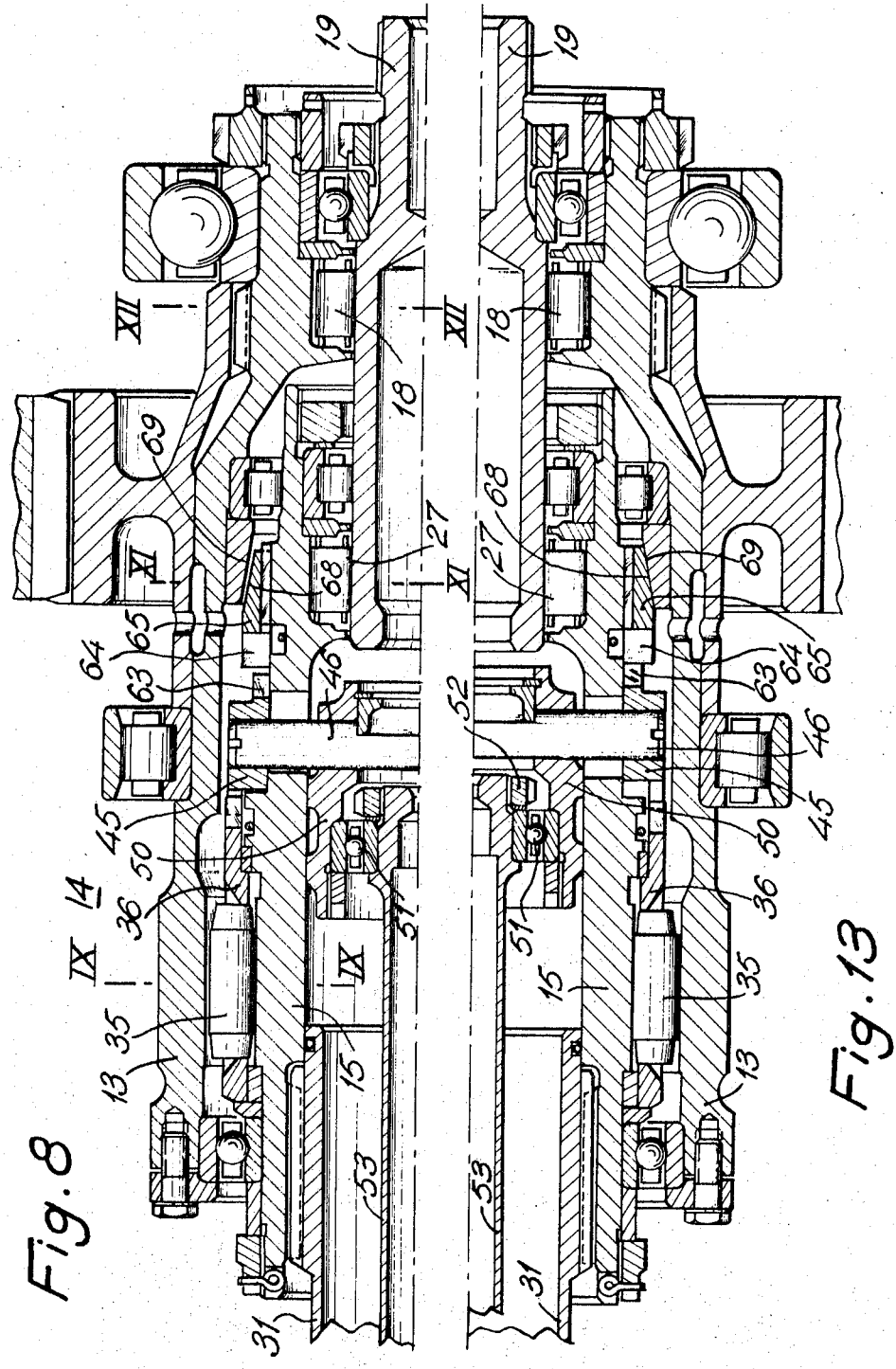

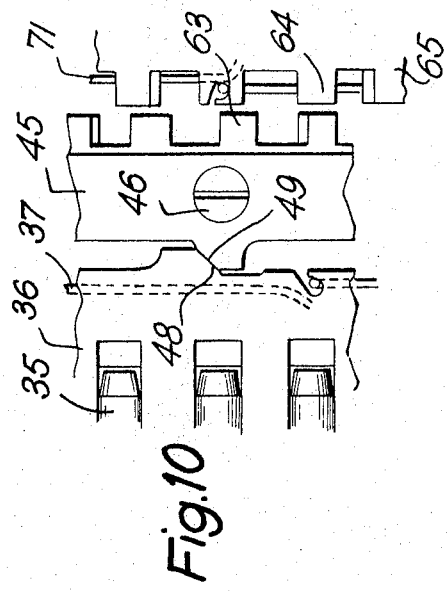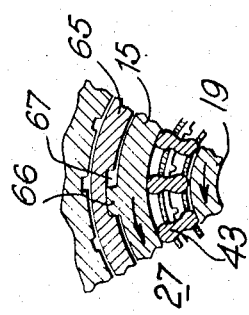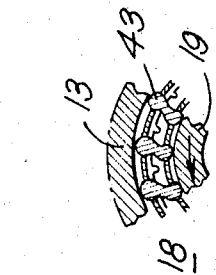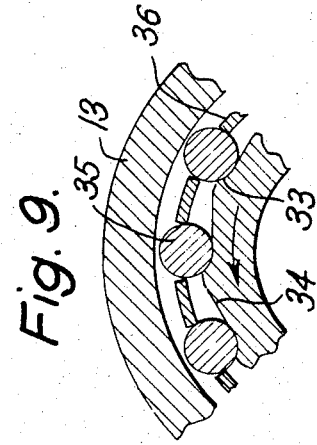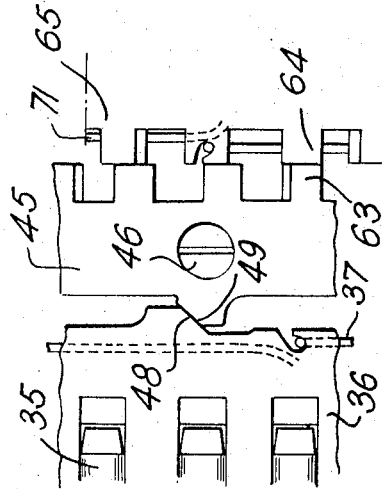

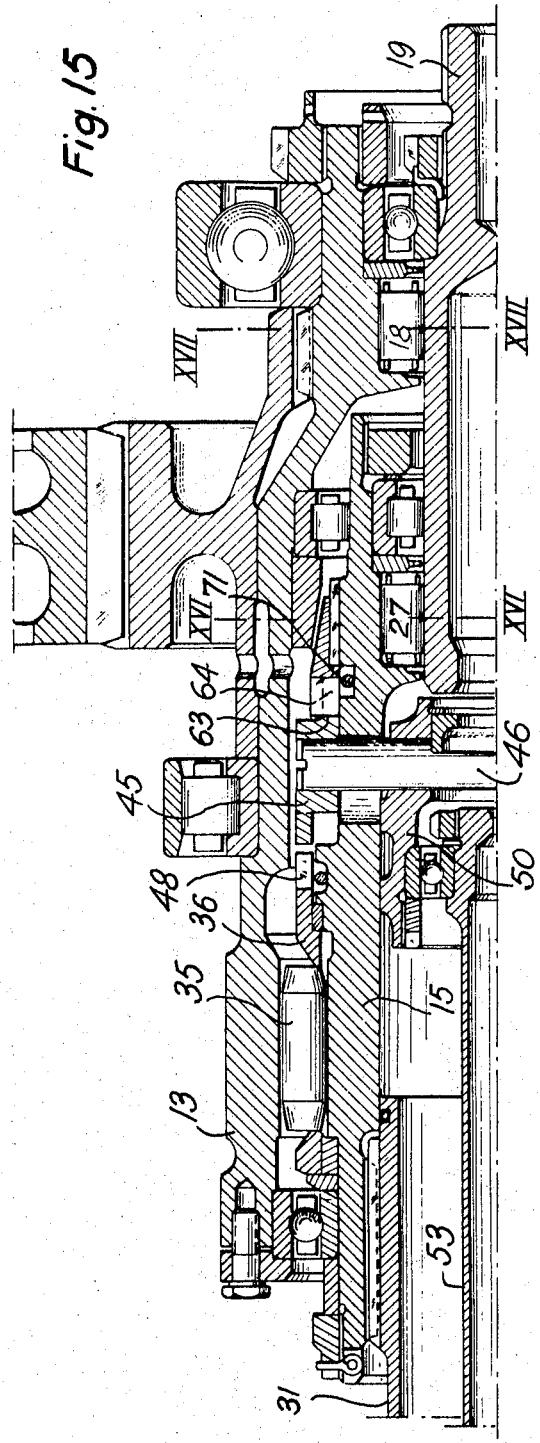
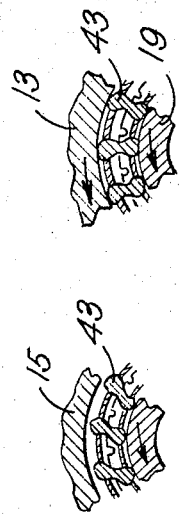

3,362,255
POWER TRANSMITTING MECHANISMS, AND APPLICATIONS THEREOF, MORE PARTICULARLY TO HELICOPTERS
Lucio de Rocca, Turin, Italy, and Jacques Francois Xavier Pouchelle, Marignane, Bouches-du-Rhone, France, assignors to Sud-Aviation Societe Nationale de Constructions Aeronautiques, Paris, France
Filed Oct. 15, 1965, Ser. No. 496,500
Claims priority, application France, Nov. 13, 1964, 994,803, Patent 1,422,328
9 Claims. (Cl. 74—665)

ABSTRACT OF THE DISCLOSURE

A mechanism for transmitting power from a common power source to two receiving members or groups of receiving members, comprising three coaxial shafts respectively connected permanently to said common power source and to said two members or groups of members, and coupled or decoupled in pairs by means of three automatically actuated clutching means interposed between each pair of shafts, a lock-out means avoiding any action of said first clutching means and means for preventing any accidental locking-in of the first clutching means.

---

This invention relates to a mechanism for transmitting power to two members from a common power source, one of these members having to be driven continuously and the other having either to be halted, to be driven by said common power source, or to be used as a motor for driving the first member which is then disconnected from the source. Such a power transmitting mechanism can be applied to helicopters with advantage, the first continuously driven member being the hydraulic, electrical or pneumatic ancillary systems and the second member the rotor or rotors.

Current practice on helicopters is for these ancillary systems ot be driven by power take-offs from the main transmission box, so that even under auto-rotation conditions these ancillaries continue to be driven notwithstanding the fact that the power from the engine or engines is shut off. In this widely adopted solution, however, it is impossible to dispose of the energy supplied by the ancillary systems when the transmission box components, and consequently the rotor, are not rotating. A case in point is when the helicopter is on the ground with the rotor stopped, before take-off or after landing.

With a view to avoiding this drawback it has been proposed to equip helicopters with a self-contained ancillary powerplant driven by a small turbine engine that can be started up on the ground regardless of whether the rotor is stopped or revolving. However, this arrangement entails a weight penalty and high cost.

It has also been proposed to equip helicopters with a set of main ancillaries (usually duplicated for safety reasons and driven in the conventional manner) and also with a set of auxiliary ancillaries driven by an electric motor which is independent and therefore capable of operating when the rotor or rotors are halted, in which case the necessary power is supplied by the generator of one of the free turbine-type turbine engines, with the turbogenerator being run at under normal r.p.m. and the free turbine being held stationary by means of a rotor brake. Although this system is satisfactory, provided that the auxiliary ancillary systems are required to produce only control power, this solution calls for a drive motor of prohibitive weight if the systems to be driven necessitate a relatively large amount of power. Further, the interconnections needed between the main and auxiliary circuits will be complicated if these main circuits are to be controlled, with the rotor stopped from the power delivered by the auxiliary circuits.

The subject power transmission system of the present invention permits of mitigating these various drawbacks by providing concentrated means ensuring great compactness, whereby it may be devised with minimum weight in its application to helicopters.

The invention accordingly has for its object a mechanism for transmitting power to two members or sets of members from a common power source, said mechanism comprising three coaxial shafts which are permanently connected respectively to the common source and to the two members or sets of members and are interconnected or disconnected in pairs through the medium of three automatic clutching and declutching devices inserted respectively between the paired shafts. Preferably, these automatic clutching and declutching devices are freewheels coaxial with the shafts.

A control system for locking-out the main freewheel interposed between the shaft connected to the power source and the shaft connected to the second member or set of members advantageously permits of preventing the latter from being driven by the power source, a safeguard being provided to prevent accidental locking-in of the main freewheel, particularly when the rotation speed is such that the main freewheel would be liable otherwise to transmit the drive from the power source to the still halted second member or set of members.

In the case of application to helicopters in particular, it is thus possible on the ground, notably prior to take-off, to prevent the rotor or rotors from being driven by the turbine coupled to the power transmitting mechanism while at the same time ensuring, by means of the safeguard, that locking-in of the control for interdicting the drive to the rotors does not inadvertently cause the rotor or rotors to be driven and thereby result in the main freewheel being destroyed.

In order to provide the possibility, after the second member or set of members (the rotor in the case of a helicopter) has stopped, of causing said member or set of members to be driven without damaging the main freewheel, the latter is associated to means for locking-in of the same after the second member or set of members has been momentarily run up to a speed greater than that imparted by the common power source.

The description which follows with reference to the accompanying non-limitative exemplary drawings will give a clear understanding of how the invention can be carried into practice.

In the drawings:

FIG. 1 schematically illustrates a power transmitting mechanism according to the invention, as applied to a helicopter powered by two turbine engines;

FIG. 3 is a partial external view of the main freewheel, of the locking means thereof and of the safeguards in the locked-in position when the helicopter is in normal flight;

FIGS. 4 and 5 are sections taken through the lines IV—IV and V—V of FIG. 2, respectively;

FIG. 6 shows in diametrical section the main freewheel locking means;

FIG. 7 shows the linkage system for operating the locking means;

Figure 1:
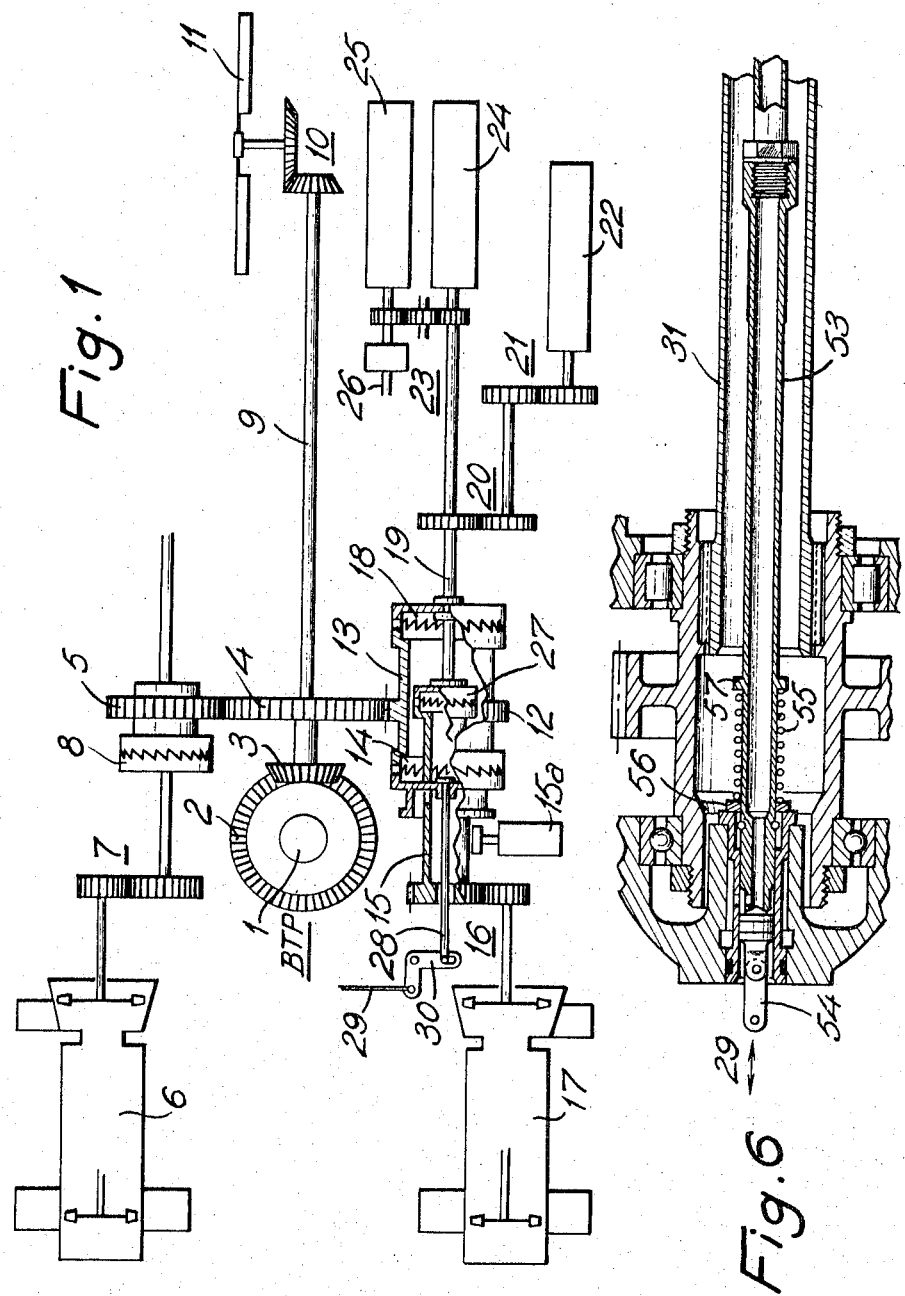

FIG. 8 shown in diametrical half-section the power transmitting mechanism in the configuration in which the turbine drives only the ancillaries, the rotor being stopped;

FIG. 9 is a section on line IX—IX of FIG. 8;

FIG. 10 is a view corresponding to FIG. 3, subsequent to activation of the main freewheel locking means and of the safeguard;

FIGS. 11 and 12 are sections on the lines XI—XI and XII—XII of FIG. 8, respectively;

FIG. 13 is a view corresponding to FIG. 8, showing the instant when the main freewheel locking means is operated to lock-in the freewheel;

FIG. 14 is a view corresponding to FIG. 10, showing the disposition of the freewheel, the locking means and the safeguard in the configuration of FIG. 13;

FIG. 15 is a diametrical half-sectional view of the power transmitting mechanism in the configuration in which the turbine is stopped and the ancillaries are driven by the auto-rotating rotor; and FIGS. 16 and 17 are fragmental sections through the lines XVI—XVI and XVII—XVII of FIG. 15, respectively.

Although the accompanying drawings refer to a mechanism for transmitting power to accessory device or ancillaries and to the rotor of a helicopter powered by one or more engines such as turbine engines for instance, it will be manifest that the subject mechanism of the invention, of the kind shown in the drawings, may be utilized for driving two members or sets of members from a single engine, with one of these members or sets of members having to be continuously driven as in the case of the helicopter ancillaries, and the other, as in the case of the helicopter rotor or rotors, having either to be stopped, to be driven by the motor, or to be used as drive means for driving the first member.

As is schematically illustrated in FIG. 1, the helicopter rotor rigid with the rotor shaft 1 is driven through the agency of a main transmission box BTP the input bevel wheel 2 of which is driven by a bevel pinion 3 rigidly connected to a gearwheel 4 meshing with a pinion 5 which is driven by one of the turbine engines 6 in the conventional manner through a train of gears 7 and a freewheel 8 represented diagrammatically in the form of a dog-clutch. Through a shaft 9 and a bevel coupling 10, gearwheel 4 drives the helicopter tail rotor 11.

Gearwheel 4 additionally meshes with a set of teeth 12 formed on a hollow rotating shaft 13 connected through a freewheel 14 to a drive hub 15 which is in turn connected through a train of gears 16 to the output shaft of the second turbine 17. Hollow shaft 13 is further connected through a freewheel 18 to the ancillary systems drive shaft 19 which, through the medium of gear trains 20 and 21, drives an oil pump 22 and, through a gear train 23, an AC generator 24 and a hydraulic pump 25, a tachometer drive take-off 26 being provided to indicate the operating speed of these three ancillaries. A third freewheel 27 is inserted between the drive hub 15 and the ancillaries shaft 19.

Hollow shaft 13, hub 15, shaft 19 and freewheels 14, 18 and 27 are coaxial and jointly form the power transmitting mechanism according to the present invention. This mechanism further comprises control means for locking the freewheel 14, i.e. the main freewheel, said control means comprising a member 28 for disconnecting the component parts of said freewheel responsively to a control 29 coupled, together with member 28, to a bell-crank 30. It will be appreciated that according to whether control 29 is activated or not, and depending on the rotation speeds imparted to drive hub 15 and hollow shaft 13, the accessories shaft 19 will be rotated continuously in response either to the turbine engine 17 or the rotor carried by shaft 1.

The manner of operation of the system will now be described in detail with reference to the form of embodiment shown in FIGS. 2 to 17.

Figure 2:
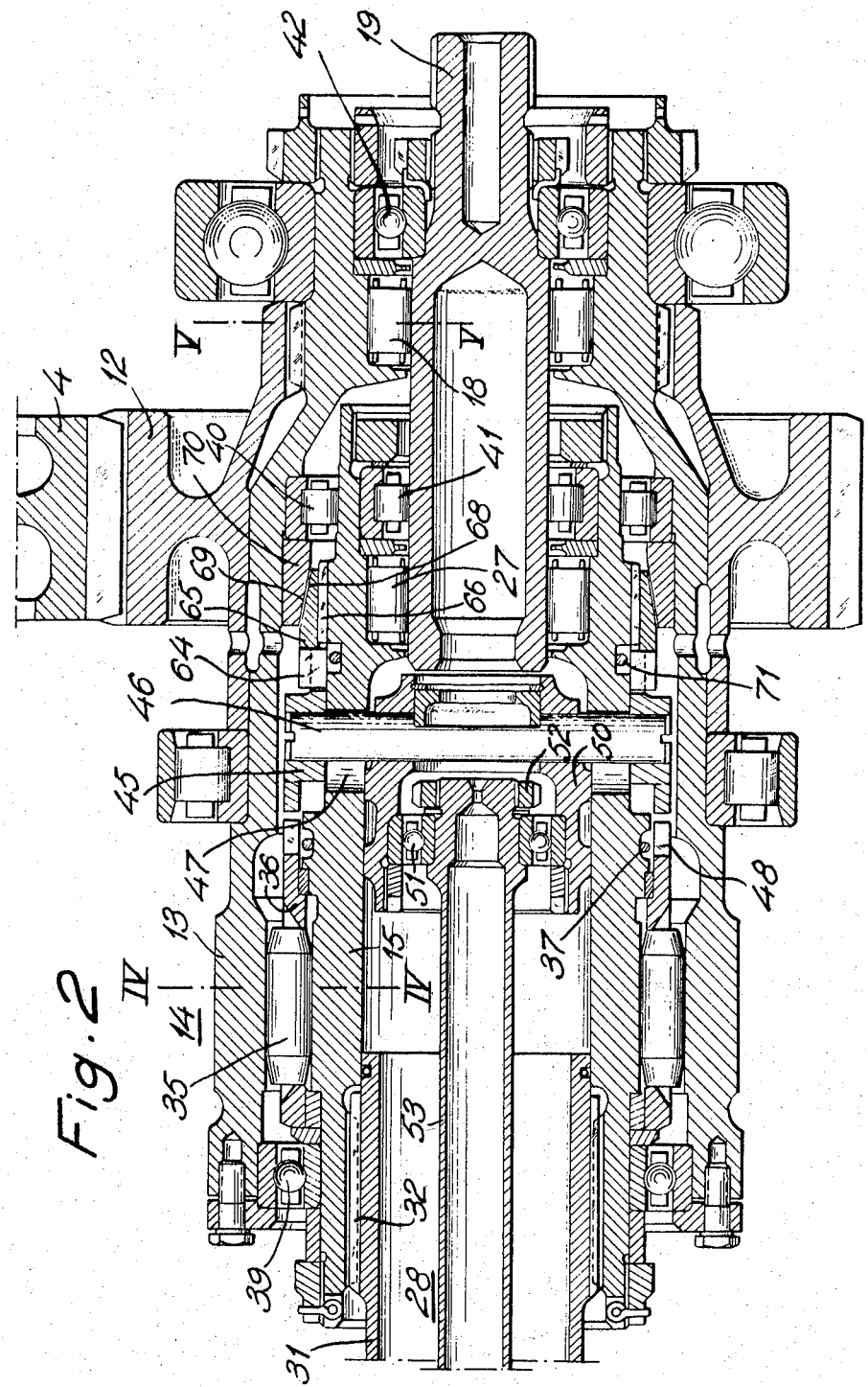
FIG. 2 is a diametrical sectional view of a power transmitting mechanism according to the invention in a form of embodiment suitable for helicopters, in the configuration for simultaneously driving the ancillaries and the rotor, namely in the normal flight configuration of the helicopter.

A shaft 31 coupled by any convenient means to the turbine 17 is formed with splines 32 engaging with matching splines formed on drive hub 15 whereby to positively drive the latter (see FIG. 2). Upon its outer surface, drive hub 15 is formed with a set of longitudinal recesses 33 bordered on one side by ramps 34. Located in these recesses are cylindrical rollers 35 which are interconnected by a cage 36 (see FIGS. 3 and 4). A coil spring 37 is fastened to the cage at 38 and spring-loads the rollers 35 onto the ramps 34.

Mounted on two anti-friction bearings 39 and 40, concentrically with drive hub 15, is the hollow shaft 13 integral with pinion 12 which meshes with gearwheel 4 and drives the rotor or rotors through the gear train in the main transmission box.

The accessories drive shaft 19 is loosely mounted on two anti-friction bearings 41 and 42, with the two freewheels 27 and 18 (the auxiliary freewheels) being interposed respectively between drive hub 15 and shaft 19 and between hollow shaft 13 and shaft 19. As FIG. 5 clearly shows in respect of the freewheel 18, these auxiliary freewheels are of known type and consist of small rollers 43 shaped as a figure eight in section and interconnected by a cage 44. The rollers 43 are so contoured that locking occurs in one direction of relative motion of the inner and outer rings of the freewheel, and free motion in the other direction. Clearly, however, any other convenient freewheel system may be utilized.

The main freewheel locking means 14 is a sleeve 45 slidably mounted on drive hub 15 and having a shaft 46 extending therethrough which is movable in two diametrically opposed oblong openings 47 formed in drive hub 15. The cage 36 of main freewheel 14 and the sliding sleeve 45 bear facing helical ramps 48 and 49, as shown in FIG. 3. The shaft 46 extends through a bush 50 which is slidable within drive hub 15. Bush 50 is connected through a ball bearing 51 and a nut 52 to a non-rotating shaft 53 carrying said nut. Shaft 53 is accommodated concentrically within drive shaft 31 and has its end connected to a link 54 connected in turn to the pilot-operated control 29 (see FIG. 6). A spring 55 is interposed between a fixed abutment 56 and an abutment 57 rigid with shaft 53.

As shown in FIG. 7, the control 29 comprises a lever 58 mounted for instance on the ceiling of the cabin of helicopter 59 and connected to a transmission system 60 terminating at a bell-crank 61 which is connected in turn through a bell-crank 62 to a link 54.

On its side remote from the helical ramps 49, sliding sleeve 45 is formed with a plurality of teeth 63 between which engage, in the rotor driving configuration, further teeth 64 (see FIG. 3) formed on a second safeguard sleeve 65 which is slidable to a small extent on drive hub 15 and is capable of rotating thereabout through a distance limited by teeth 66 formed on the hub and engaging with internal splines 67 on the sleeve 65 that are wider than the teeth 66 (see FIG. 11).

On its end remote from the teeth 64 the safeguard sleeve 65 is formed with a conical male bearing surface 68 adapted to engage with a conical female surface 69 formed on a part 70 which is rigidly connected in any convenient manner to hollow shaft 13. A coil spring 71 fixed at 72 to the sleeve 65 (see FIG. 3) urges the latter into abutment with the teeth 66 in the manner described hereinafter.

The mechanism referred to functions as follows:

Before the rotor is speeded up responsively to turbines 6 and 17, the main freewheel 14 is locked (FIG. 8) to enable the ancillary systems to be started up first. The pilot accordingly shifts the lever 58 in order to move the bush 50 away from the accessories shaft 19, whereby the ramps 49 of sleeve 45 are caused to engage with the ramps 48 of cage 36. This holds the cage stationary so that the rollers 35 of main freewheel 14 are located opposite the recesses 33 (see FIG. 9). This prevents the rollers from riding up the ramps 34 and jamming between drive hub 15 and hollow shaft 13.

The turbine 17 can then be started and it rotates drive hub 15 but not the rotor. In this configuration the accessories shaft 19 is driven by freewheel 27, freewheel 18 remaining loose (see FIGS. 11 and 12).

The sliding motion of sleeve 45 towards cage 36 causes the teeth 64 of safeguard sleeve 65 to disengage from the teeth 63 of sliding sleeve 45, whereby the safeguard sleeve rotates about drive hub 15 responsively to spring 71 until it abuts against the teeth 66 and causes its own teeth 64 to register with the teeth 63 of sliding sleeve 45. As a result, accidental releasing of the control 29 remains ineffective, whereas in the absence of the safeguard consisting of sleeve 65, releasing the control 29 would have allowed the rollers 35 to jam suddenly between the ramps 34 of the rapidly rotating drive hub and the stationary hollow shaft 13, to the detriment of the main freewheel which could be destroyed as a result.

In this configuration the ancillaries are driven directly by the turbine, the rotor or rotors remaining stationary.

To transmit the drive to the rotor or rotors and enable the helicopter to take off, the pilot releases control lever 58, causing sliding bush 50 to move within the drive hub 15, responsively to the spring 55, towards the accessories shaft 19. Sleeve 45 is then thrust towards safeguard sleeve 65 which it thrusts away in turn (FIG. 13), the teeth 63 and 64 of these sleeves coming into mutual contact in the process (FIG. 14). This retraction is limited by engagement of male cone 68 with the female cone 69 rigid with the rotor or rotors. Thenceforward the terminal retraction of sleeve 45 for releasing cage 36 and reverting to the configuration of FIG. 3 can take place only provided that the hollow shaft 13 rigid with the rotor is rotating faster than the drive hub 15 rigid with the turbine.

In order to obtain this effect with the rotor or rotors halted, it is necessary to cause the latter to be driven independently of turbine 17. This is accomplished by causing the rotor to revolve slightly faster than the turbine 17 (in the ratio of their respective speeds) by starting up turbine engine 6.

As long as hollow shaft 13 rotates more slowly than drive hub 15, the friction engendered between cones 68 and 69 adds itself to the effect of coil spring 71 to keep safeguard sleeve 65 in abutment against the teeth 66, in a position such that the teeth 63 and 64 remain opposite one another and thereby prevent retraction of sliding sleeve 45 (see FIG. 14).

As soon as hollow shaft 13 is rotated faster than drive hub 15, the friction between cones 68 and 69 cancels out the effect of coil spring 71 and rotates safeguard sleeve 65 whereby the spaces between its teeth 64 are caused to register with the teeth 63 of sliding sleeve 45, thereby enabling the latter to withdraw and release cage 36 responsively to spring 55 being freed by the control 29. Since hollow shaft 13 is rotating faster than drive hub 15, the main freewheel rollers 35 will at this point occupy a position similar to that shown in FIG. 9.

Rotation of drive hub 15 in the appropriate direction by the turbine 17 will, subsequent to a reduction in the rotor speed, cause rollers 35 to jam between ramps 34 and hollow shaft 13. The rotor will then be driven by both turbines and the helicopter can take off, with the mechanism as a whole assuming the configuration shown in FIG. 2.

If turbine 17 is shut down, hollow shaft 13 will continue to rotate due to the auto-rotation of the rotor and will cause the rollers 35 to move towards the recesses 33, thus clearing the jamming effect and preventing the turbine from being rotated (see FIG. 15).

In the two last-mentioned cases, the accessories shaft 19 is driven either by drive hub 15 via auxiliary freewheel 27, or by the hollow shaft 13 rigid with the rotor, via auxiliary freewheel 18. In the flight configuration of FIG. 2, the ancillaries are driven by whichever of drive hub 15 rigid with the turbine, or hollow shaft 13 rigid with the rotor, is faster.

In the case of a single-engine helicopter, in order to permit total retraction of sliding sleeve 45 and consequent releasing of cage 36, a brake 15a—of the disc type for instance—is interposed on drive shaft 31 between the mechanism hereinbefore described and the free-turbine type turbine engine in order to momentarily either halt or slow down the rotation of drive hub 15. As the pilot operates the control 29 to re-engage the main freewheel 14, the rotor is either rotated slightly by manual pressure on its blades, or rotated by an auxiliary drive device such as that described in the U.S. Patent No. 3,196,612 filed by the applicant on June 26, 1963.

The mechanism as a whole is lubricated by oil which reaches the center of its coaxial members through the fixed shaft 53 which is hollow for the purpose. The lubricant is circulated by a centrifuging of the oil as it pentrates into shaft 53 through its end adjacent the control link 54, a plurality of suitable orifices being provided in said shaft level with the mechanism.

What we claim is:

1. In a mechanism for transmitting power to two devices from a common power source, comprising coaxial first and second shafts permanently connected respectively to said two devices, a third shaft coaxial with the first two shafts and permanently connected to said common power source, first automatic clutching and declutching means interposed between said second and third shafts, second automatic clutching and declutching means interposed between said first and third shafts, and third automatic clutching and declutching means interposed between said first and second shafts, said automatic clutching and declutching means including freewheels coaxial with said shafts, the improvement comprising lock-out means for avoiding a clutching action of said first freewheel and means for preventing accidental locking-in thereof.

2. A transmission mechanism according to claim 1, comprising means for momentarily speeding up the second of said devices to a rotation speed greater than that imparted by said third shaft and means for locking-in, and thereby permitting clutching action of said first freewheel, which cooperates then with said means for momentarily speeding up said second device.

3. A transmission mechanism according to claim 2, wherein said first freewheel comprises, in combination, a cage, a multiplicity of rollers restrained therein between said second shaft and said third shaft, recesses and ramps formed on said second and third shafts respectively, means for positioning said free rollers in said recesses when the speed of the third shaft is greater than that of the second shaft, and means for jamming said rollers on said ramps when the speed of the third shaft is greater than that of the second shaft.

4. A transmission mechanism according to claim 3, comprising, in combination, a coil spring in said cage for biasing said rollers into a jammed position on said ramps, a sleeve sliding on said third shaft, ramps formed on said sliding sleeves, lateral ramps on said cage, means for urging said lateral ramps into engagement with said ramps formed on said sliding sleeve whereby to disconnect the second device from the power source by locking-out the first freewheel, and a return spring for countering the latter means.

5. A transmission mechanism according to claim 2, wherein the means for preventing accidental locking-in of the first freewheel comprises, in combination, a safeguard sleeve mounted on the third shaft, a first set of teeth on said safeguard sleeve, a second set of teeth matching the first set and formed on said sliding sleeve, means for causing the first set of teeth to engage in the gaps between the teeth of the second set in the locking-in configuration, internal splines on said safeguard sleeve, teeth on the third shaft for engaging said splines with clearance and a coil spring cooperating with said safeguard sleeve for rotating it to an extent limited by said teeth on the third shaft and for causing the first set of teeth to register with the second set of teeth in the locked-out configuration.

6. A transmission mechanism according to claim 2, wherein said means for locking-in the first freewheel comprises a female cone rigid with the second shaft, a safeguard sleeve on the third shaft, a male cone on said safeguard sleeve and means for mutually engaging said male and female cones.

7. In a helicopter having at least one rotor, ancillary systems and turbines, the improvement comprising coaxial first and second shafts permanently connected respectively to said ancillary systems and to each rotor, a third shaft coaxial with the first two shafts and permanently connected to a first turbine, a first freewheel interposed between said second and third shafts, a second freewheel interposed between said first and third shafts, a third freewheel interposed between said first and second shafts, means for locking said first freewheel to avoid a clutching action thereof, means for preventing accidental locking-in of said first freewheel, means for momentarily speeding up the rotor to a speed greater than that imparted by said first turbine, and means for locking-in said first freewheel which cooperates with said means for momentarily speeding up said rotor.

8. A helicopter according to claim 7, wherein said means for momentarily speeding up the rotor to a speed greater than that imparted by said first turbine comprises a second turbine.

9. In a helicopter having at least one rotor, ancillary systems and a turbine, the improvement comprising coaxial first and second shafts permanently connected respectively to said ancillary systems and to each rotor, a third shaft coaxial with the first two shafts and permanently connected to said turbine, a first freewheel interposed between said second and third shafts, a second freewheel interposed between said first and third shafts, a third freewheel interposed between said first and second shafts, means for locking-out said first freewheel to avoid a clutching action thereof, means for preventing accidental locking-in of said first freewheel, means for momentarily speeding up a rotor to a speed greater than that imparted by said turbine, a brake operating on said third shaft and means for locking-in said first freewheel which cooperates with said means for momentarily speeding up said rotor.

References Cited
UNITED STATES PATENTS

| | | | |
|---|---|---|---|
| 1,946,177 | 2/1934 | Neurath | 192—47 |
| 2,269,965 | 1/1942 | Wemp | 192—47 |
| 2,885,896 | 5/1959 | Hungerford et al. | 192—48 |
| 2,967,499 | 1/1961 | Cohen | 192—48 |
| 3,026,739 | 3/1962 | Hungerford et al. | 192—48 |
| 3,031,901 | 5/1962 | Simpson | 192—48 |

FOREIGN PATENTS 393,298  1/1933  Great Britain.

DONLEY J. STOCKING, *Primary Examiner.*

ARTHUR T. McKEON, *Examiner.*

J. R. BENEFIEL, *Assistant Examiner.*